United States Patent
Merzhaeuser et al.

(10) Patent No.: US 11,149,709 B2
(45) Date of Patent: Oct. 19, 2021

(54) METHOD TO REDUCE NOISE AND VIBRATION IN A JOINTED WIND TURBINE BLADE, AND ASSOCIATED WIND TURBINE BLADE

(71) Applicant: General Electric Company, Schenectady, NY (US)

(72) Inventors: Thomas Merzhaeuser, Munich (DE); Andreas Herrig, Garching b. Muenchen (DE)

(73) Assignee: General Electric Company, Schenectady, NY (US)

(*) Notice: Subject to any disclaimer, the term of this patent is extended or adjusted under 35 U.S.C. 154(b) by 418 days.

(21) Appl. No.: 16/139,185

(22) Filed: Sep. 24, 2018

(65) Prior Publication Data

US 2020/0095977 A1   Mar. 26, 2020

(51) Int. Cl.
   *F03D 1/06* (2006.01)
   *F01D 25/06* (2006.01)

(52) U.S. Cl.
   CPC ............ *F03D 1/0683* (2013.01); *F01D 25/06* (2013.01); *F05B 2240/301* (2013.01); *F05B 2260/84* (2013.01); *F05B 2260/96* (2013.01)

(58) Field of Classification Search
   CPC ........ F03D 1/065; F03D 1/0675; F03D 7/022; F03D 7/0224; F03D 7/0228; F03D 7/0296; F03D 13/10; F05B 2240/301; F05B 2240/302; F05B 2240/305; F05B 2240/311; F05B 2240/312; F01D 25/06
   See application file for complete search history.

(56) References Cited

U.S. PATENT DOCUMENTS

| | | | |
|---|---|---|---|
| 7,344,360 B2 | 3/2008 | Wetzel | |
| 2009/0155084 A1 | 6/2009 | Livingston et al. | |
| 2011/0091326 A1 | 4/2011 | Hancock | |
| 2012/0294714 A1* | 11/2012 | Friedrich | F03D 7/0228 416/1 |
| 2014/0234108 A1 | 8/2014 | Nägler | |
| 2014/0271185 A1* | 9/2014 | Baker | F03D 1/0675 416/1 |
| 2014/0322013 A1* | 10/2014 | Elkin | F03D 1/025 416/131 |

(Continued)

FOREIGN PATENT DOCUMENTS

EP   3144526 A1   3/2017

OTHER PUBLICATIONS

PCT Search Report, dated Dec. 13, 2019.

*Primary Examiner* — Courtney D Heinle
*Assistant Examiner* — Sang K Kim
(74) *Attorney, Agent, or Firm* — Dority & Manning, P.A.

(57) ABSTRACT

A method to reduce noise and vibration between separate blade segments of a jointed wind turbine rotor blade includes determining an actual offset at a chord-wise joint line between the shell members of the first and second blade segments at a load condition on the jointed wind turbine rotor blade, wherein the offset is any one or combination of a flap-wise offset, a twist-wise offset, or a yawl-wise offset. The method defines a modified configuration of the joint structure at a no-load condition on the wind turbine rotor blade that compensates at least partially for the actual offset at the load condition, and the first and second blade segments are connected with the modified configuration of the joint structure.

14 Claims, 6 Drawing Sheets

(56) References Cited

U.S. PATENT DOCUMENTS

| | | |
|---|---|---|
| 2015/0369211 A1 | 12/2015 | Merzhaeuser |
| 2018/0003151 A1 | 1/2018 | Loth et al. |
| 2018/0223796 A1 | 8/2018 | Yarbrough et al. |
| 2018/0238300 A1* | 8/2018 | Shain .................. F03D 13/10 |
| 2019/0136828 A1* | 5/2019 | Hancock .............. F03D 1/0675 |

\* cited by examiner

FIG. 9a initial unloaded state

FIG. 9b initial loaded state

FIG. 9c modified unloaded state

FIG. 9d modified loaded state

METHOD TO REDUCE NOISE AND VIBRATION IN A JOINTED WIND TURBINE BLADE, AND ASSOCIATED WIND TURBINE BLADE

FIELD

The present subject matter relates generally to wind turbine rotor blades and, more particularly, to a spar configuration between segments of a jointed blade designed to reduce noise and vibration generated at the joint profile.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Wind turbine rotor blades generally include a body shell formed by two shell halves of a composite laminate material. The shell halves are generally manufactured using molding processes and then coupled together along the corresponding ends of the rotor blade. In general, the body shell is relatively lightweight and has structural properties (e.g., stiffness, buckling resistance, and strength) which are not configured to withstand the bending moments and other loads exerted on the rotor blade during operation.

In recent years, wind turbines for wind power generation have increased in size to achieve improvement in power generation efficiency and to increase the amount of power generation. Along with the increase in size of wind turbines for wind power generation, wind turbine rotor blades have also significantly increased in size (e.g., up to 55 meters in length), resulting in difficulties in integral manufacture as well as conveyance and transport of the blades to a site.

In this regard, the industry is developing sectional wind turbine rotor blades wherein separate blade segments are manufactured and transported to a site for assembly into a complete blade (a "jointed" blade). In certain constructions, the blade segments are joined together by a beam structure that extends span-wise from one blade segment into a receiving section of the other blade segment. Reference is made, for example, to US Patent Publication No. 2015/0369211, which describes a first blade segment with a beam structure extending lengthways that structurally connects with a second blade segment at a receiving section. The beam structure forms a portion of the internal support structure for the blade and includes a shear web connected with a suction side spar cap and a pressure side spar cap. Multiple bolt joints are used to connect the beam structure with the receiving section in the second blade segment, including a span-wise bolt on the end face of the beam and at least one chord-wise bolt through the beam structure spaced from the joint line between the blade segments.

Similarly, US Patent Publication No. 2011/0091326 describes a jointed blade wherein a first blade portion and a second blade portion extend in opposite directions from a joint. Each blade portion includes a spar section forming a structural member of the blade and running lengthways, wherein the first blade portion and the second blade portion are structurally connected by a spar bridge that joins the spar sections. The spar bridge may be an extension of one of the spar sections that is received in a receiving spar section of the other blade portion. This configuration also uses a threaded bolt extending from the end face of the spar to connect and tension the spar in the receiving spar section.

It has been found, however, that the jointed blade configurations are susceptible to increased vibration and noise generation resulting from the joint. Relative deflections between the root-end blade segment and the tip-end blade segment result in flap-wise offsets between the shell members at the joint line. This situation is particularly present in the jointed blade designs that employ a chord-wise bolt or pin spaced (span-wise) from the joint line to transfer loads from the chord-wise bolt into the blade shells. This span-wise spacing, in combination with a difference in stiffness and orientation between the blade segment and jointed internal support structure, results in the flap-wise offsets between the shell members.

In addition to the induced flap-wise offset, torsion forces are also generated at the jointed structure that generate a twist offset between the shell members, particularly at the trailing edge of the blade.

As air flows over the shell surfaces under loaded conditions of the wind turbine, the flap-wise and/or twist-wise offsets at the joint line result in generation of turbulent vortices, which can add significantly to vibration and noise being generated at the joint line. Additionally, twist offsets can reduce power performance of the wind turbine at the design condition.

Therefore, an improved joint structure between the blade segments of a jointed blade that addresses the issues noted would be an advantageous advancement in the art.

BRIEF DESCRIPTION

Aspects and advantages of the invention will be set forth in part in the following description, or may be obvious from the description, or may be learned through practice of the invention.

In one aspect, the present disclosure is directed to a method to reduce noise and vibration in a joint configuration between a first blade segment and a second blade segment of a jointed wind turbine rotor blade. Each of the first and second blade segments include a shell member having a pressure side shell component and a suction side shell component. The method includes determining an actual offset that is induced at a chord-wise joint line between the shell members of the first and second blade segments at a load condition on the jointed wind turbine rotor blade, wherein the actual offset is any one or combination of a flap-wise offset generated by a flap-wise force, a twist-wise offset generated by a twist-wise force, or a yawl-wise offset generated by a yawl-wise force. Based on these induced offsets, a modified configuration of the joint structure is defined at a no-load condition on the wind turbine rotor blade that compensates at least partially for one or more of the actual offset components at the load condition. The first and second blade segments are then connected or joined with the modified configuration of the joint structure, wherein at the load condition, the modified configuration of the joint structure reduces one or both of the flap-wise offset and the twist-wise offset between the shell members of the first and second blade segments.

The method is not limited to a particular joint structure between the blade segments. In a particular embodiment, however, the joint structure includes a beam structure extending span-wise from the first blade segment and a receiving section formed in the second blade segment for receipt of the beam structure, wherein the modified configuration of the joint structure includes a change in connection between the beam structure and the receiving section. For example, the first blade segment may be a tip-end blade segment, and the second blade segment is a root-end blade segment. The joint structure may include a chord-wise pin extending through the beam structure and the receiving section at a location spaced from the joint line in a span-wise direction. The modified configuration of the joint structure may include an alternate location of the chord-wise pin that compensates for one or more of the flap-wise offset, twist-wise offset, or yawl-wise offset at the load condition. The alternate location may be selected to produce one or more of a counter flap-wise offset, counter twist-wise offset, or counter yawl-wise offset at the no-load condition.

In still another embodiment of the method, the step of determining the modified configuration of the joint structure includes determining a combination of materials in the joint structure that also may contribute to reducing one or more of the flap-wise offset, twist-wise offset, or yawl-wise offset at the load condition. This combination of materials may be a stand-alone modification to the joint structure, or may be in combination with a change in location of the chord-wise pin, or other alteration of the joint structure. The change is materials may include, for example adding or removing materials from the joint structure to achieve a stiffness or torsion resistance that reduces one or more of the flap-wise offset, twist-wise offset, or yawl-wise offset at the load condition.

In particular embodiments, the load condition is the load when approaching rated output speed of a wind turbine on which the jointed wind turbine rotor blade is used, and the flap-wise offset, twist-wise offset, or yawl-wise offset at the load condition are based on an average of the respective offsets at the rated output speed over a certain range of wind speed. This determination may be an actual measurement from operational wind turbines, or may be made via computer modeling of the jointed wind turbine blade at the load condition.

The present invention also encompasses a jointed wind turbine rotor blade with joint structure having the characteristics discussed above. In particular, such a blade includes a first blade segment and a second blade segment extending in opposite directions from a chord-wise joint line, each of the blade segments having a pressure side shell member and a suction side shell member. A joint structure is provided between the first blade segment and the second blade segment, wherein the joint structure includes a counter offset at a no-load condition on the rotor blade that compensates for one or more of a flap-wise offset, twist-wise offset, or yawl-wise offset at a load condition. With this configuration, the joint structure reduces noise and vibration generated by the jointed wind turbine rotor blade at the load condition.

In a particular blade embodiment, the joint structure includes a beam structure extending span-wise from the first blade segment, and a receiving section formed in the second blade segment for receipt of the beam structure. The first blade segment may be a tip-end blade segment, while the second blade segment is a root-end blade segment. The joint structure may include a chord-wise pin extending through the beam structure and the receiving section at a location spaced from the joint line in a span-wise direction, wherein the chord-wise pin is at a location that generates at least partly the counter offset at the no-load condition.

In a particular embodiment of the rotor blade, the joint structure includes a combination of materials that may also aid in reducing one or more of the flap-wise offset, twist-wise offset, or yawl-wise offset at the load condition. This combination of materials may be a stand-alone modification to the joint structure, or may be in combination with a change in location of the chord-wise pin. The change is materials may include, for example adding or removing materials from the joint structure to achieve a stiffness or torsion resistance that reduces one or both of the flap-wise offset and the twist-wise offset at the load condition.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to jointed wind turbine rotor blades having a modified joint structure configuration that serves to compensate for or counter one or both of flap-wise and twist-wise offsets between the blade segments at a load condition on the rotor blade. With the present unique method and rotor blade configuration, noise and vibration generated at the joint line between the blade segments is reduced.

Figure 1:
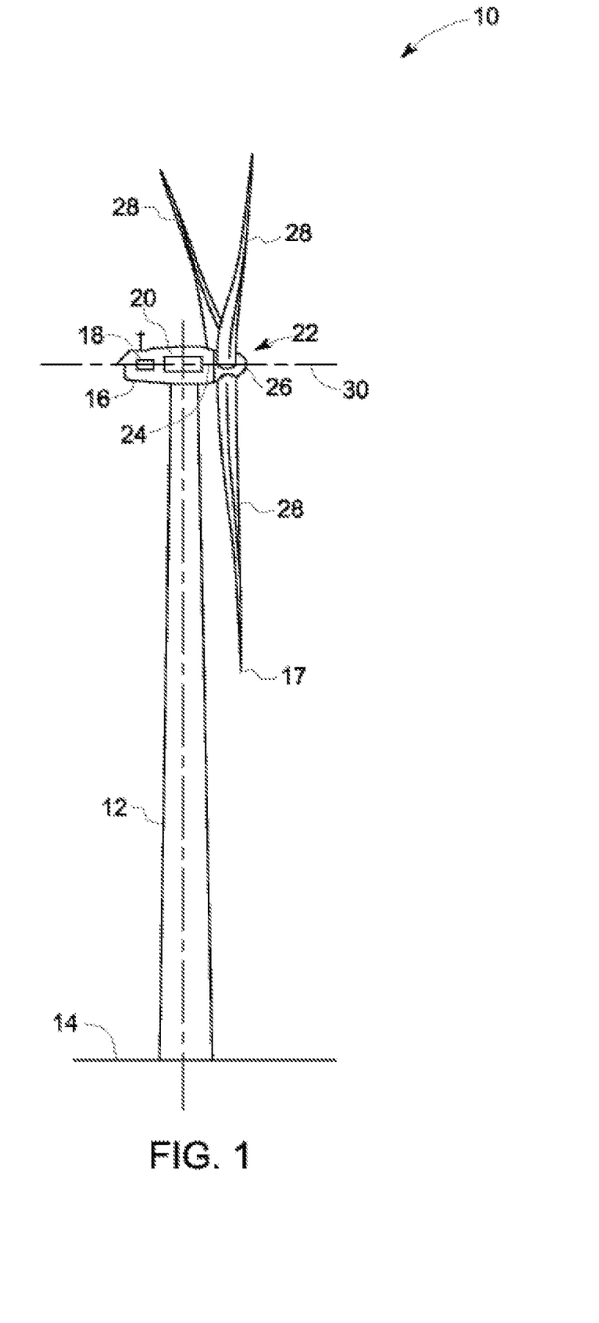
FIG. 1 illustrates a perspective view of a wind turbine that may utilize a jointed wind turbine blade according to the present disclosure.

Referring now to the drawings, FIG. 1 is a side view of an exemplary wind turbine 10 that may use jointed wind turbine rotor blades in accordance with an embodiment of the present invention. In this embodiment, the wind turbine 10 is a horizontal-axis wind turbine. Alternatively, the wind turbine 10 may be a vertical-axis wind turbine. In the present embodiment, the wind turbine 10 includes a tower 12 that extends from a support surface 14, a nacelle 16 mounted on the tower 12, a generator 18 positioned within the nacelle 16, a gearbox 20 coupled to the generator 18, and a rotor 22 that is rotationally coupled to the gearbox 20 with a rotor shaft 24. The rotor 22 includes a rotatable hub 26 and at least one rotor blade 28 coupled to and extending outward from the rotatable hub 26. As shown, the rotor blade 28 includes a blade tip 17 to a blade root 19.

Figure 2:
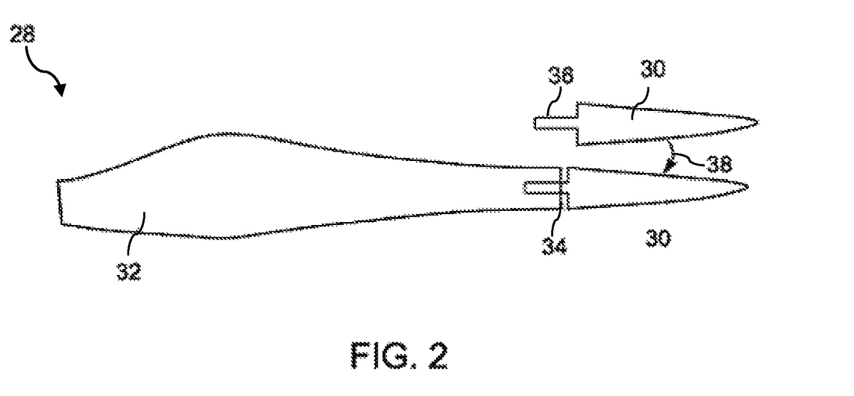
FIG. 2 illustrates a rotor blade having a first blade segment and a second blade segment, and joint structure that connects the blade segments.
Figure 3:
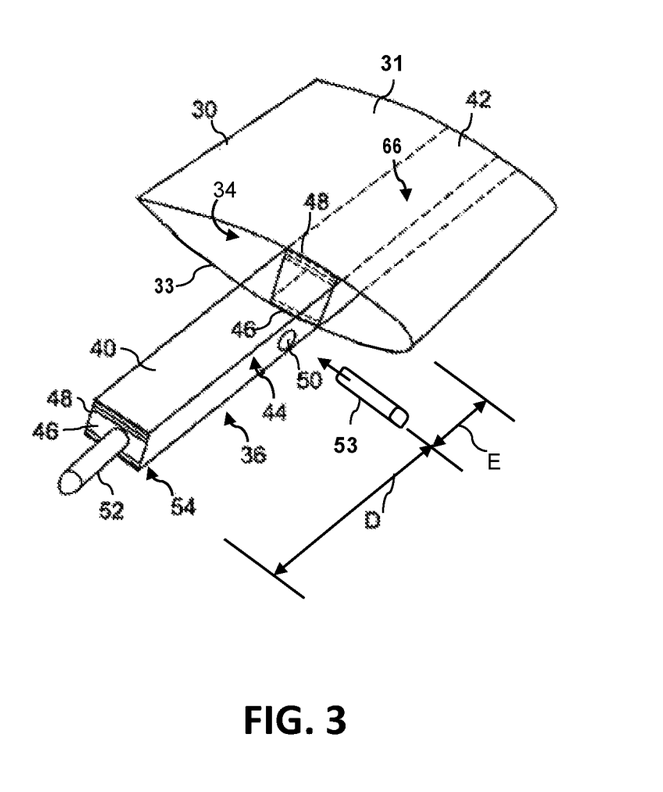
FIG. 3 is a perspective view of an embodiment of a first blade segment with joint structure.

Referring to FIGS. 2 and 3, a jointed rotor blade 28 is depicted having a first blade segment 30 and a second blade segment 32 in accordance with aspects of the present technology. The first blade segment 30 and the second blade segment 32 extend in opposite directions from a chord-wise joint line 34. Each of the blade segments 30, 32 includes a pressure side shell member 31 and a suction side shell member 33. The first blade segment 30 and the second blade segment 32 are connected by an internal support structure 36 extending into both blade segments 30, 32 to facilitate joining of the blade segments 30, 32. The arrow 38 shows that the segmented rotor blade 28 in the illustrated example includes two blade segments 30, 32 and that these blade segments 30, 32 are joined by inserting the internal support structure 36 into the second blade segment 32.

In the depicted embodiment, the first blade segment includes a beam structure 40 that forms a portion of the internal support structure 36 and extends lengthways (e.g., span-wise) for structurally connecting with the internal support structure 36 in the second blade segment 32. The beam structure 40 may be integrally formed with the first blade segment 30 as an extension protruding from a spar section 42, thereby forming an extended spar section. The beam structure 40 includes at least one interconnecting web 44 (e.g., a shear web) connected with a suction side spar cap 46 and a pressure side spar cap 48. In the illustrated embodiments, the beam structure 40 is formed as a box-type structure having opposite interconnecting webs 44.

The first blade segment 30 may include one or more first bolt joints (also referred to as "pins") towards a first end 54 of the beam structure 40. For example, a bolt 52 may be located on the end 54 of the beam structure 40 and oriented in a span-wise direction. The first blade segment 30 may also include a bolt joint slot 50 located on the beam structure 40 proximate to the chord-wise joint 34 and oriented in a chord-wise direction. There may be a bushing within the bolt joint slot 50 arranged in a tight interference fit with a bolt tube or pin 53 used to connect the second blade segment 32 to first blade segment 30. It should be appreciated that any combination of bolt tubes 52, 53 and bolt slots 50 may be configured between the beam structure 40 and a receiving section 60 (FIG. 4) for the purpose of interconnecting the first 30 and second 32 blade segments.

Figure 4:
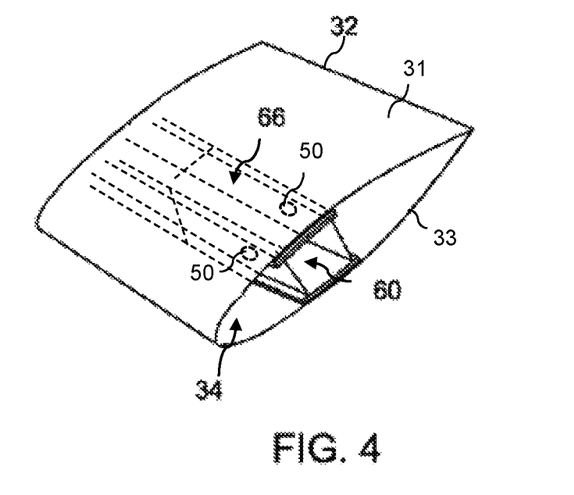
FIG. 4 is a perspective view of an embodiment of a second blade segment with joint structure.

In FIG. 4, the second blade segment 32, the internal support structure 36 includes a receiving section 60 extending lengthways (span-wise) within the second blade segment 32 for receiving the beam structure 40 of the first blade segment 30. The receiving section 60 includes multiple spar structure components 66 that extend lengthways for connecting with the beam structure 40 of the first blade segment 30 along a length of the receiving section 60. Although not depicted in FIG. 4, it is readily understood that the receiving section 60 includes any combination of bolt slots 50 or bolts 52, 53 for interconnecting with corresponding bolts or slots of the beam structure 40. For example, a bolt slot is configured in a distal end (away from the chord-wise joint 34) of the receiving section 60 for receipt of the bolt 52 provided on the end 54 of the beam structure 40.

Figure 5:
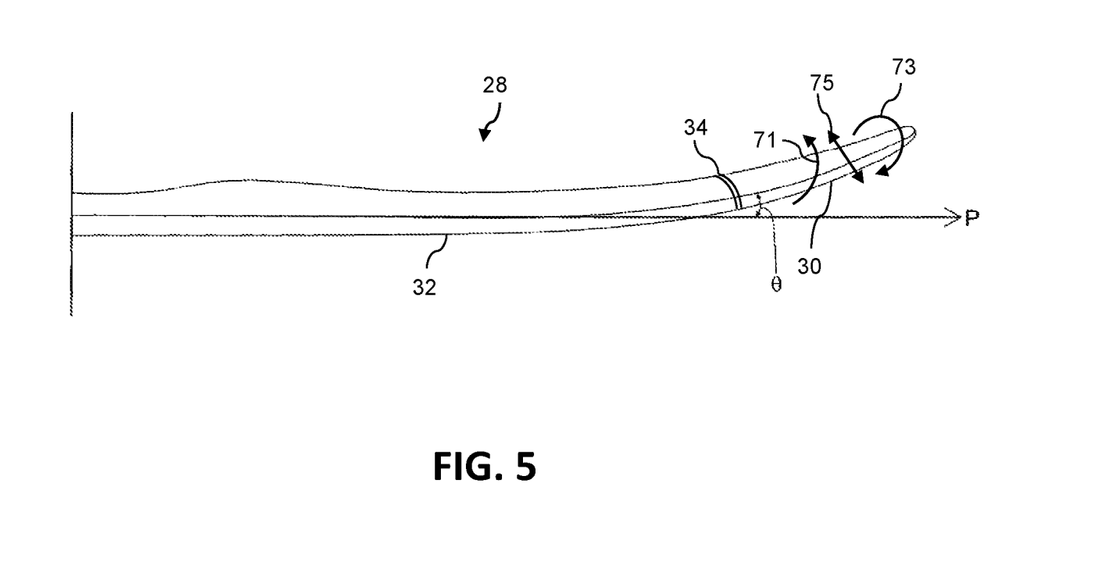
FIG. 5 is a perspective view of a jointed wind turbine blade depicting with flap-wise and twist-wise forces acting on the blade.

FIG. 5 depicts the concepts of flap-wise 71, twist-wise 73, and yawl-wise 75 forces acting on the jointed wind turbine blade, wherein such forces can respectively generate a flap-wise offset 70 (FIG. 6), a twist-wise offset 72 (FIG. 7), and a yawl-wise offset 77 (FIG. 6) between the shell components of the first and second blade segments 30, 32 at the chord-wise joint 34. These offset components 70, 72, and 77 can combine to induce an actual offset 68 between the shell components. The flap-wise forces 71 tend to act uniformly across the chord aspect of the first blade segment 30 causing the first blade segment 30 to essentially "bend" towards the second blade segment 32 and displace the shell members 31 in a vertical direction 70 along the chord-wise joint 34. The twist-wise forces 73 tend to generate a twisting of the first blade segment 30 relative to the second blade segment 32 along a span-wise axis of the blade resulting in a twist-wise offset 72 of the shell members 31 along the chord-wise joint 34. The yawl-wise forces 75 tend to generate a side-ways movement of the first blade segment 30 relative to the second blade segment 32 transverse to the span-wise axis of the blade resulting in a yawl-wise offset 77 of the shell members 31 along the chord-wise joint 34. As explained above, these induced offsets 70, 72, 77 can generate excessive vibrations and noise in the blade 28 at operational load on the wind turbine (load on the turbine blades 28 when the wind turbine 10 is operating in the rated power output range of the power curve).

Figure 6:
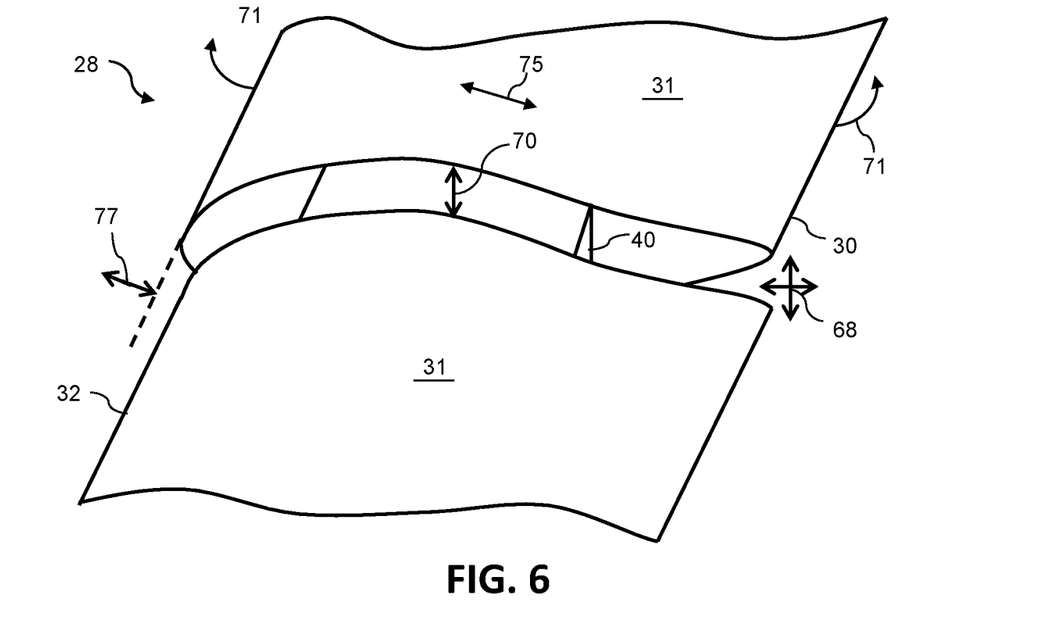
FIG. 6 is a partial perspective view of the joint line between blade segments depicting a flap-wise induced offset between the blade segments at the joint line.
Figure 7:
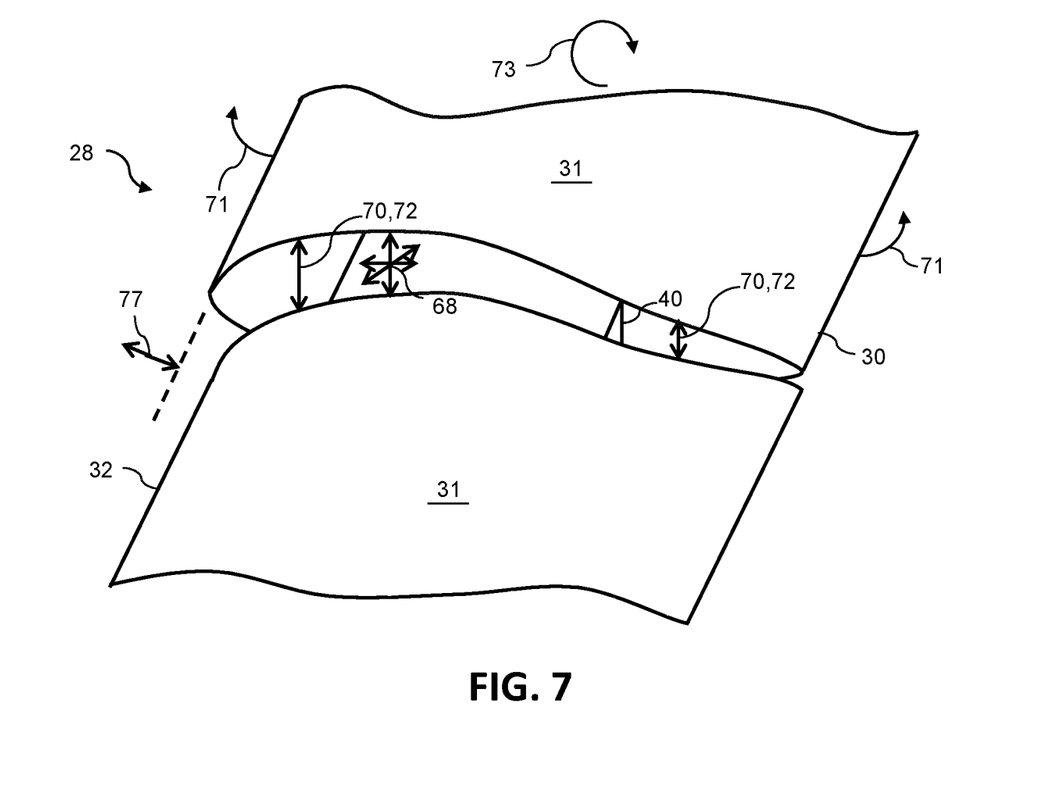
FIG. 7 is a partial perspective view of the joint line between blade segments depicting a flap-wise and twist-wise induced offset between the blade segments at the joint line.

FIG. 6 depicts the actual offset 68 as a combination of the flap-wise offset 70 and the yawl-offset 77. FIG. 7 depicts the actual offset 68 as a combination of the flap-wise offset 70, the twist-wise offset 72, and the yawl-wise offset 77. It should be appreciated that the actual offset 68 may be induced from any one or combination of the offset components 70, 72, and 77.

In addition, referring to FIG. 5, the blades 28 may be designed with a no-load moderate sweep inboard (closer to blade root) relative to blade pitch axis P, while the outboard section (closer to the blade tip) may be swept aft up to 10 degrees (angle θ in FIG. 5) relative to pitch axis P.

In FIGS. 8A through 8d, determination and compensation for a flap-wise offset 70 induced in the blade 28 under load is depicted in accordance with aspects of the present disclosure. Similarly, in FIGS. 9a through 9d, determination and compensation for a twist-wise offset 72 induced in the blade 28 under load is depicted. It should be appreciated that similar methods can be employed for determination and compensation for the yawl-wise offset.

Figure 8A:
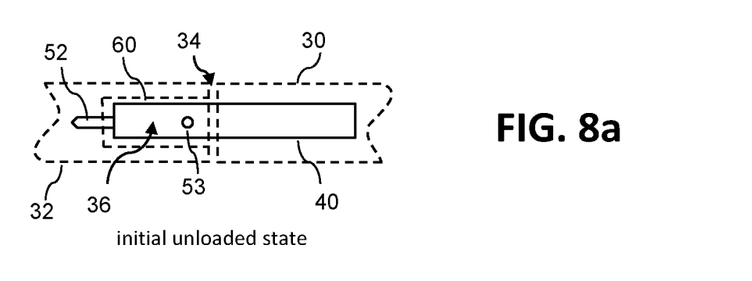
FIGS. 8a through 8d are sequential diagram views of an embodiment for modifying the joint structure in a jointed wind turbine blade to compensate for flap-wise induced offsets at a load condition on the blade.
Figure 8B:
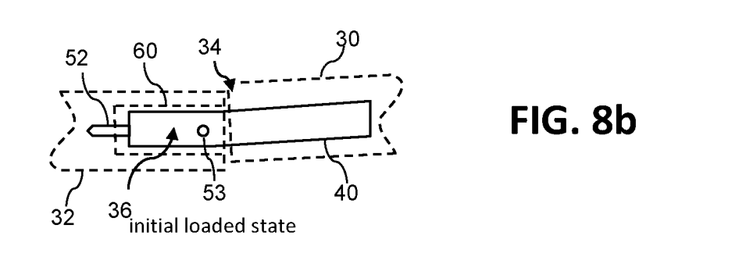
Figure 9A:
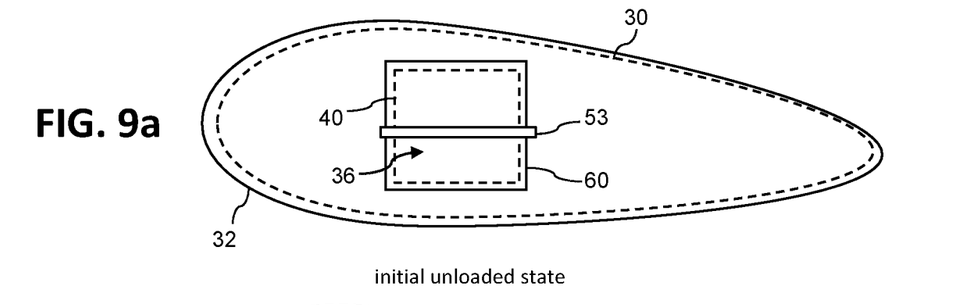
FIGS. 9a through 9d are sequential diagram views of an embodiment for modifying the joint structure in a jointed wind turbine blade to compensate for twist-wise induced offsets at a load condition on the blade.
Figure 9B:
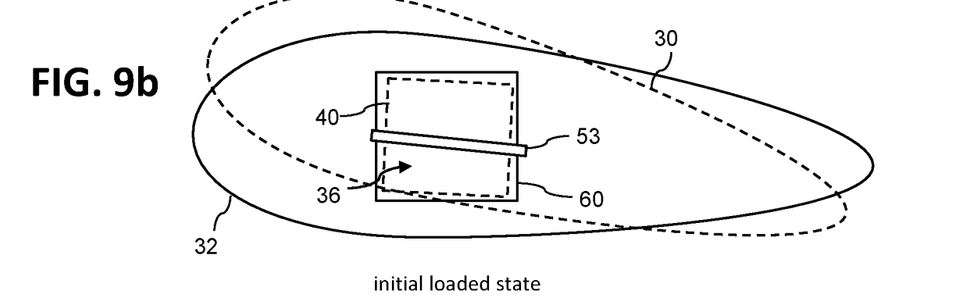

Referring to FIGS. 8a and 9a, the jointed blade 28 is depicted at the chord-wise joint 34 in an initial unloaded condition wherein an initial negligible flap-wise or twist-wise offset is induced in the blade at the joint 34. FIG. 8b depicts the same jointed blade 28 at an initial loaded condition, for example under load at rated power of the wind turbine, wherein a flap-wise offset 70 is depicted between the shell members of the first blade segment 30 and the second blade segment 32 at the chord-wise joint 34. Similarly, FIG. 9b, depicts the jointed blade 28 in an initial loaded condition, for example under load when approaching or at rated power of the wind turbine, wherein a twist-wise offset 72 is depicted between the shell members of the first blade segment 30 and the second blade segment 32 at the chord-wise joint 34. The present method includes determining the magnitude of one or both of the flap-wise offset 70 and twist-wise offset 72. This determination may be done by measurement of the actual offset at the chord-wise joint 34 with sensors, camera, and so forth, when the blade 28 (or similar blade) is under load. Alternatively, the actual offset may be determined via a suitable modeling program. As mentioned, it is appreciated that the actual offset 68 at the chord-wise joint 34 may be a combination of the flap-wise offset 70, the twist-wise offset 72, and the yawl-wise offset 77. Also, any one of these offsets may be negligible, wherein the actual offset is due primarily to one or a combination of the other offsets under load on the blade 28.

Figure 8C:
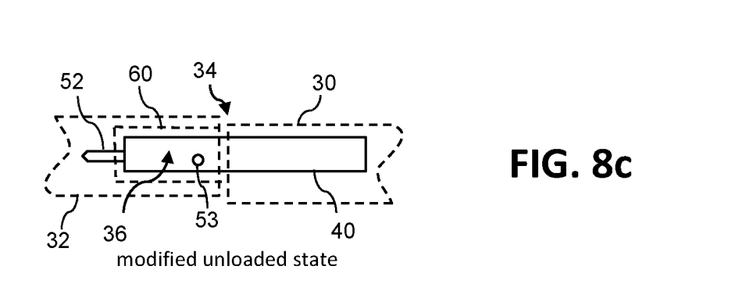

Referring to FIG. 8c, based on the actual offset induced at the joint 34 with the blade 28 under load, a modified configuration of the joint structure 36 is defined at a no-load condition on the blade 28 that will compensate for the induced offset. This modified configuration may only compensate for one of the flap-wise offset 70 or the twist-wise offset 72, but preferably compensates for both types of offsets 70, 72.

It should be appreciated that the present methods encompass the scenario wherein the actual offset 68 is determined empirically or via computer modeling for a particular type of blade at a defined location, and this offset 68 is then used to define the modified configuration for a subsequent number of blades 28. It is not necessary to determine the actual offset and modified configuration on an individual basis for every blade 28.

As mentioned, the modified configuration of the joint structure 36 may include determining a combination of materials in the joint structure 36 that reduces one or both of the flap-wise offset 70 and the twist-wise offset 72 at the load condition. This combination of materials may be a stand-alone modification to the joint structure, or may be in combination with a change in location of the components of the joint structure 36, as described below. The change is materials may include, for example adding or removing materials from the joint structure 36 to achieve a stiffness or torsion resistance that reduces one or both of the flap-wise offset 70 and the twist-wise offset 72 at the load condition.

FIG. 8c depicts an embodiment wherein the joint structure 36 is structurally modified in an unloaded state of the blade 26 to compensate for the induced flap-wise offset 70 (FIG. 8b) at a load condition. In this embodiment, the joint structure 36 includes the beam structure 40 extending span-wise from the first blade segment 30 (tip-end segment) and a receiving section 60 formed in the second blade segment 32 (root-end segment) for receipt of the beam structure 40. The modified configuration of the joint structure 36 includes a change in connection between the beam structure 40 and the receiving section 60. The joint structure 36 includes a chord-wise pin 53 extending through the beam structure 40 and the receiving section 60 at a location spaced from the joint line 34 in a span-wise direction. An alternate location of the chord-wise pin 53 is determined that compensates for the flap-wise offset 70 at the load condition, wherein the alternate location is selected to produce a counter flap-wise offset 76 at the no-load condition on the blade 28. For example, as exaggerated in FIG. 8C for illustrative purposes, the chord-wise pin 53 may be lowered or raised towards the pressure or suction side of the blade 28 relative to the initial position depicted in FIG. 8a to produce the counter flap-wise offset 78.

Figure 9C:
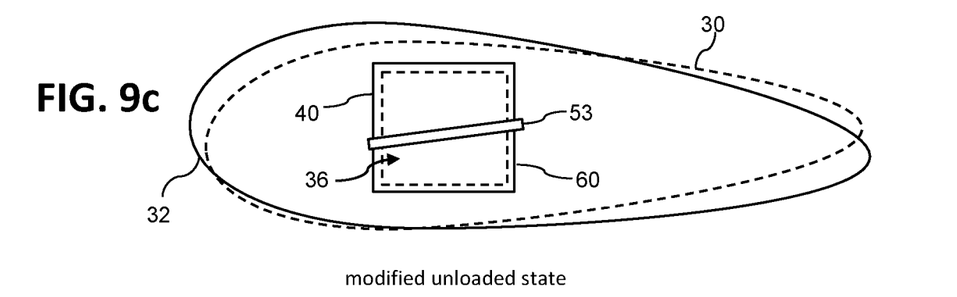

Similarly, FIG. 9c depicts an embodiment wherein the joint structure 36 is structurally modified in an unloaded state of the blade 26 to compensate for the induced twist-wise offset 72 (FIG. 9b) at a load condition. The modified configuration of the joint structure 36 includes a change in connection between the beam structure 40 and the receiving section 60. The joint structure 36 includes the chord-wise pin 53 extending through the beam structure 40 and the receiving section 60 at a location spaced from the joint line 34 in a span-wise direction. An alternate location of the chord-wise pin 53 is determined that compensates for the twist-wise offset 72 at the load condition, wherein the alternate location is selected to produce a counter twist-wise offset 78 at the no-load condition on the blade 28. For example, as exaggerated in FIG. 9C for illustrative purposes, the chord-wise pin 53 may be rotated from the initial orientation depicted in FIG. 9a to the modified position in FIG. 9c to produce the counter twist-wise offset 78.

Figure 8D:
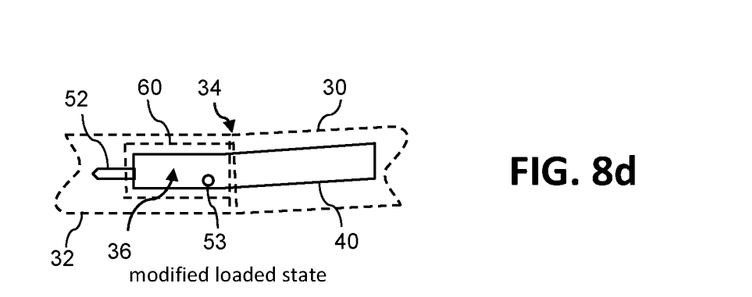
Figure 9D:
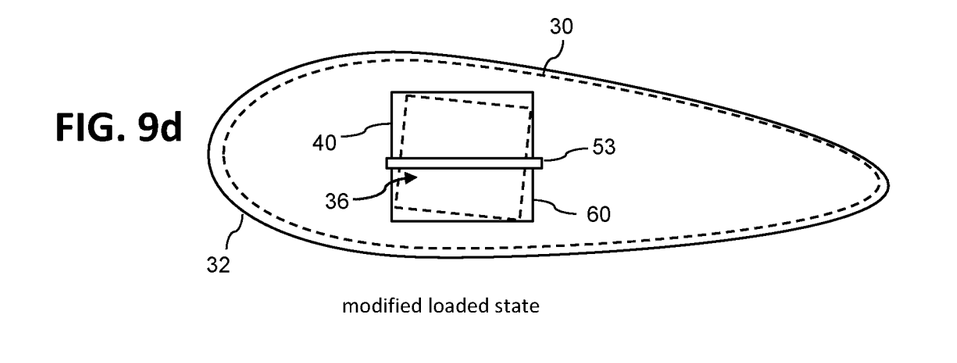

Once the modifications to the joint structure 36 are determined, the jointed blade 28 is assembled in accordance with such modifications. FIG. 8c depicts the modified assembled jointed blade 28 in an unloaded state, and FIG. 8d depicts the blade 28 under load wherein the flap-wise offset 70 present in FIG. 8b has been compensated for by the modifications depicted in FIG. 8c. Likewise, FIG. 9c depicts the modified assembled jointed blade 28 in an unloaded state, and FIG. 9d depicts the blade 28 under load wherein the twist-wise offset 72 present in FIG. 9b has been compensated for by the modifications depicted in FIG. 9c.

The present invention also encompasses a jointed wind turbine rotor blade 28 with joint structure 36 having the characteristics discussed above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method to reduce noise and vibration generated by joint structure configuration between a first blade segment and a second blade segment of a jointed wind turbine rotor blade, the first and second blade segments each comprising a shell member, the method comprising:

measuring an load-condition offset at a chord-wise joint line between the shell members of the first and second blade segments at a load condition on the jointed wind turbine rotor blade, the load-condition offset comprising a displacement between the first and second blade segments measured at the chord-wise joint line, wherein the load-condition offset is any one or combination of a sideway displacement generated by a flap-wise force, a twist displacement generated by a twist-wise force, or a vertical displacement generated by a yawl force acting on the first blade segment;

defining a modified configuration of the joint structure at a no-load condition on the wind turbine rotor blade that compensates at least partially for the load-condition offset at the load condition;

connecting the first and second blade segments with the modified configuration of the joint structure; and wherein at the load condition, the modified configuration of the joint structure at least partially reduces the load-condition offset between the shell members of the first and second blade segments.

2. The method of claim 1, wherein the joint structure comprises a beam structure extending span-wise from the first blade segment and a receiving section formed in the second blade segment for receipt of the beam structure, the modified configuration of the joint structure comprising a change in connection between the beam structure and the receiving section.

3. The method of claim 2, wherein the first blade segment is a tip-end blade segment, and the second blade segment is a root-end blade segment, the joint structure comprising a chord-wise pin extending through the beam structure and the receiving section spaced from the joint line in a span-wise direction, wherein the modified configuration comprises a location of the chord-wise pin that compensates for one or more of the flap-wise offset, twist-wise offset, or yawl-wise offset at the load condition.

4. The method of claim 3, wherein the location of the chord-wise pin in the modified configuration produces one or more of a counter flap-wise offset, a counter twist-wise offset, or a counter yawl-wise offset at the no-load condition.

5. The method of claim 1, wherein the modified configuration comprises a combination of materials in the joint structure that compensates for one or more of the flap-wise offset, the twist-wise offset, or the yawl-wise offset at the load condition.

6. The method of claim 5, wherein the modified configuration comprises adding or removing materials from the joint structure to achieve a stiffness or torsion resistance that compensates for one or more of the flap-wise offset, the twist-wise offset, or the yawl-wise offset at the load condition.

7. The method of claim 1, wherein the load condition is load when approaching rated output speed of a wind turbine on which the jointed wind turbine rotor blade is used, and the load-condition offset is an average of the load-condition offset at the load condition.

8. The method of claim 1, wherein the load-condition offset is determined via computer modeling of the jointed wind turbine blade at the load condition.

9. A jointed wind turbine rotor blade, comprising:
a first blade segment and a second blade segment extending in opposite directions from a chord-wise joint line, each of the blade segments having a pressure side shell member and a suction side shell member;

a joint structure between the first blade segment and the second blade segment;

the joint structure comprising a counter offset at a no-load condition on the jointed wind turbine rotor blade that compensates for one or more of a flap-wise offset, a twist-wise offset, or a yawl-wise offset that would be induced between the first blade segment and the second blade segment at a load condition;

the counter offset comprising a set and defined displacement between the first blade segment and the second blade segment at the chord-wise joint having a magnitude in any one or combination of a sideways direction, vertical direction, or twist direction such that at the load condition, flap-wise twist-wise, and yawl-wise forces acting on the first and second blade segments reduce the counter offset and bring the first blade segment and the second blade segment into alignment at the chord-wise joint; and wherein the joint structure reduces noise and vibration generated by the jointed wind turbine rotor blade at the load condition.

10. The jointed wind turbine rotor blade of claim 9, wherein the joint structure comprises a beam structure extending span-wise from the first blade segment, and a receiving section formed in the second blade segment for receipt of the beam structure.

11. The jointed wind turbine rotor blade of claim 10, wherein the first blade: segment is a tip-end blade segment, and the second blade segment is a root-end blade segment, the joint structure comprising a chord-wise pin extending through the beam structure and the receiving section spaced from the joint line in a span-wise direction, wherein the chord-wise pin is at a location that generates at least partly the counter offset at the no-load condition.

12. The jointed wind turbine rotor blade of claim 9, wherein the joint structure comprises a combination of materials that generates at least partly the counter offset at the no-load condition.

13. The jointed wind turbine rotor blade of claim 9, wherein the load condition is load when approaching rated output speed of a wind turbine on which the jointed wind turbine rotor blade is used.

14. The jointed wind turbine rotor blade of claim 9, wherein the counter offset at the no-load condition is a computer-modeled value.

* * * * *